US010155508B2

(12) United States Patent
Matsunaga et al.

(10) Patent No.: US 10,155,508 B2
(45) Date of Patent: Dec. 18, 2018

(54) VEHICLE CONTROLLER

(75) Inventors: Hitoshi Matsunaga, Anjo (JP);
Tomoyuki Honda, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 748 days.

(21) Appl. No.: 14/351,294

(22) PCT Filed: Oct. 21, 2011

(86) PCT No.: PCT/JP2011/074326
§ 371 (c)(1),
(2), (4) Date: Apr. 11, 2014

(87) PCT Pub. No.: WO2013/057837
PCT Pub. Date: Apr. 25, 2013

(65) Prior Publication Data
US 2014/0244123 A1    Aug. 28, 2014

(51) Int. Cl.
*B60W 10/02* (2006.01)
*B60T 8/172* (2006.01)
(Continued)

(52) U.S. Cl.
CPC .......... *B60W 10/026* (2013.01); *B60T 8/172* (2013.01); *B60W 10/06* (2013.01); *B60W 10/18* (2013.01);
(Continued)

(58) Field of Classification Search
CPC .. B60T 8/172; B60T 2210/12; B60T 2260/04; B60W 10/026; B60W 10/06;
(Continued)

(56) References Cited

U.S. PATENT DOCUMENTS 6,074,326 A    6/2000  Sakakibara et al.
6,183,391 B1 *  2/2001  Iijima ................. F16H 61/14
                                                        477/62
(Continued)

FOREIGN PATENT DOCUMENTS

JP    11 247988      9/1999
JP   2008 138806     6/2006
(Continued)

OTHER PUBLICATIONS

International Search Report dated Nov. 15, 2011 in PCT/JP11/074326 Filed Oct. 21, 2011.

*Primary Examiner* — Dirk Wright
(74) *Attorney, Agent, or Firm* — Oblon, McClelland, Maier & Neustadt, L.L.P.

(57) ABSTRACT

A vehicle controller includes a first abrupt deceleration determining unit configured to determine an abrupt deceleration state of a vehicle in a first manner, and a second abrupt deceleration determining unit configured to determine the generation of the abrupt deceleration state of the vehicle in a second manner having a required time for the determination shorter in comparison with that of the first manner, wherein any one of the first manner and the second manner is selected according to a vehicle speed of the vehicle or a road surface friction coefficient and used for determining the abrupt deceleration of the vehicle, the second manner is used in a region where the vehicle speed or the road surface friction coefficient is lower, and the first manner is used in a region where the vehicle speed or the road surface friction coefficient is higher.

18 Claims, 7 Drawing Sheets

(51) Int. Cl.
*F16H 59/48* (2006.01)
*F16H 61/14* (2006.01)
*B60W 10/18* (2012.01)
*B60W 10/06* (2006.01)
*B60W 30/188* (2012.01)
*F16H 59/54* (2006.01)
*F16H 59/50* (2006.01)
*B60W 30/18* (2012.01)

(52) U.S. Cl.
CPC ......... *B60W 30/1884* (2013.01); *F16H 59/48* (2013.01); *F16H 61/143* (2013.01); *B60T 2210/12* (2013.01); *B60T 2260/04* (2013.01); *B60W 30/18109* (2013.01); *B60W 2030/1809* (2013.01); *B60W 2520/10* (2013.01); *B60W 2520/105* (2013.01); *B60W 2520/28* (2013.01); *B60W 2550/148* (2013.01); *F16H 59/54* (2013.01); *F16H 2059/506* (2013.01); *F16H 2312/18* (2013.01)

(58) Field of Classification Search
CPC ............. B60W 10/18; B60W 30/1884; B60W 2030/1809; B60W 2520/10; B60W 2520/105; B60W 2520/28; B60W 2550/148; B60W 30/18109; F16H 59/48; F16H 61/143

See application file for complete search history.

(56) References Cited

U.S. PATENT DOCUMENTS

| | | | |
|---|---|---|---|
| 6,254,203 B1* | 7/2001 | Arnold | B60T 8/171 188/1.11 R |
| 7,670,262 B2 | 3/2010 | Minaki et al. | |
| 7,672,770 B2* | 3/2010 | Inoue | B60L 11/14 701/70 |
| 8,398,180 B2* | 3/2013 | Fitton | B60T 8/17616 303/139 |
| 8,439,799 B1* | 5/2013 | Muto | F16H 61/143 477/76 |
| 8,657,721 B2* | 2/2014 | Whitney | F16H 61/143 477/176 |
| 9,045,140 B2* | 6/2015 | Iwao | B60T 8/172 |
| 2008/0215214 A1 | 9/2008 | Matsubara et al. | |
| 2009/0018757 A1 | 1/2009 | Koboyashi et al. | |

FOREIGN PATENT DOCUMENTS

| | | |
|---|---|---|
| JP | 2008 275016 | 11/2008 |
| JP | 2009 19587 | 1/2009 |

* cited by examiner

VEHICLE CONTROLLER

FIELD

The present invention relates to a vehicle controller.

BACKGROUND

To improve fuel economy, conventionally known are vehicles capable of executing a lock-up control for slip engaging a lock-up clutch at the time of deceleration and an economic run control for executing inertia traveling by interrupting a power transmission from an engine to driving wheels by disengaging a clutch. In the vehicles, when a vehicle speed is decreased by an abrupt brake operation during the lock-up control and the economic run control, there is a fear that an engine stall occurs and the engine stops.

It is preferable to accurately detect a generation of an abrupt deceleration state so that the controls can be interrupted at once at the time of abrupt deceleration. For examples, Patent Literatures 1, 2 disclose technologies for the improving a determination accuracy of an abrupt deceleration state by using together plural abrupt deceleration determining means, for example, an abrupt deceleration determining means based on a brake operation, and an abrupt deceleration determining means based on a change rate (a degree of deceleration) of each wheel speed.

Further, Patent Literature 3 discloses a technology for changing a threshold value of an abrupt deceleration determination according to whether or not a brake operation and an acceleration operation are executed.

CITATION LIST

Patent Literature

Patent Literature 1: Japanese Patent Application Laid-open No. 2009-019587
Patent Literature 2: Japanese Patent Application Laid-open No. H11-247988
Patent Literature 3: Japanese Patent Application Laid-open No. 2008-275016

SUMMARY

Technical Problem

In the technologies for using together the plural abrupt deceleration determining means described in Patent Literature 1, 2, there is a tendency that reliabilities of the respective determining means change according to a driving state, etc. In, for example, the abrupt deceleration determining means based on the brake operation, since determination accuracy is low although a determination time is short, there is a tendency that an unnecessary abrupt deceleration determination is executed to detect all of abrupt deceleration phenomena. Further, in the abrupt deceleration determining means based on the change rate of each wheel speed, since a determination time is taken although a determination accuracy is high, the means is unsuitable in a low vehicle speed region which is desired to determine an abrupt deceleration at an early stage. In the conventional technologies, since how an optimum determining means is selected to use from the plural determining means having a different reliability according to driving states as described above is not taken into consideration, there is a room for further improving the accuracy of the abrupt deceleration determination.

An object of the present invention, which was made in view of the circumstances, is to provide a vehicle controller capable of improving an accuracy of an abrupt deceleration determination.

Solution to Problem

In order to achieve the above mentioned object, a vehicle controller according to the present invention includes a first abrupt deceleration determining means configured to determine a generation of an abrupt deceleration state of a vehicle in a first manner; and a second abrupt deceleration determining means configured to determine the generation of the abrupt deceleration state of the vehicle in a second manner having a required time for the determination shorter in comparison with that of the first manner, wherein any one of the first manner and the second manner is selected according to a vehicle speed of the vehicle or a road surface friction coefficient and used for determining the abrupt deceleration of the vehicle, and the second manner is used for determining the abrupt deceleration in a region where the vehicle speed or the road surface friction coefficient is lower, and the first manner is used for determining the abrupt deceleration in a region where the vehicle speed or the road surface friction coefficient is higher.

Further, in the vehicle controller, it is preferable that the second abrupt deceleration determining means determines an abrupt deceleration operation based on brake operation information of the vehicle.

Further, in the vehicle controller, it is preferable that the first abrupt deceleration determining means includes a rotation change rate determining means configured to determine an abrupt deceleration based on a rotation change rate of each wheel or an ABS determining means configured to determine the abrupt deceleration based on an operation state of an ABS.

Further, in the vehicle controller, it is preferable that the second abrupt deceleration determining means is used in a region where a lateral acceleration of the vehicle is larger than the first abrupt deceleration determining means.

Further, in the vehicle controller, it is preferable that at the time that an abnormality occurs in the first abrupt deceleration determining means, the second abrupt deceleration determining means is used even in a region where the first abrupt deceleration determining means is used, and further a determination threshold value of an abrupt deceleration determination is increased in the region to increase a determination accuracy of the second abrupt deceleration determining means.

Further, in the vehicle controller, it is preferable that at the time that an abnormality occurs in the second abrupt deceleration determining means, the first abrupt deceleration determining means is used even in a region where the second abrupt deceleration determining means is used, and further a determination threshold value of an abrupt deceleration determination is deceased in the region to decrease a determining time of the first abrupt deceleration determining means.

Further, in the vehicle controller, it is preferable to further include a lock-up clutch disposed in a power transmission path between an engine and driving wheels, wherein when the lock-up clutch is engaged at the time that an abrupt deceleration of the vehicle is determined by the first abrupt deceleration determining means or the second abrupt deceleration determining means, the lock-up clutch is preferably abruptly disengaged.

Further, in the vehicle controller, it is preferable to further include a clutch configured to connect and disconnect a power transmission path between an engine and driving wheels, wherein an economic run control for executing inertia traveling by disengaging the clutch can be preferably executed at the time the vehicle decelerates, and when the economic run control is executed at the time an abrupt deceleration is determined by the first abrupt deceleration determining means or the second abrupt deceleration determining means, the economic run control is preferably interrupted and the clutch is engaged.

Advantageous Effects of Invention

Since the vehicle controller according to the present invention can select one from the plural abrupt deceleration determining methods using a driving state (a vehicle speed or a road surface friction coefficient) of the vehicle as a determination reference, an optimum abrupt deceleration determination can be executed according to the driving state of the vehicle with a result that an effect of capable of improving an accuracy of an abrupt deceleration determination can be achieved.

DESCRIPTION OF EMBODIMENTS

Embodiments of a vehicle controller according to the present invention will be explained below based on the drawings. In the following drawings, the same or corresponding portions are denoted by the same reference numerals and an explanation thereof will not be repeated.

First Embodiment

Figure 1:
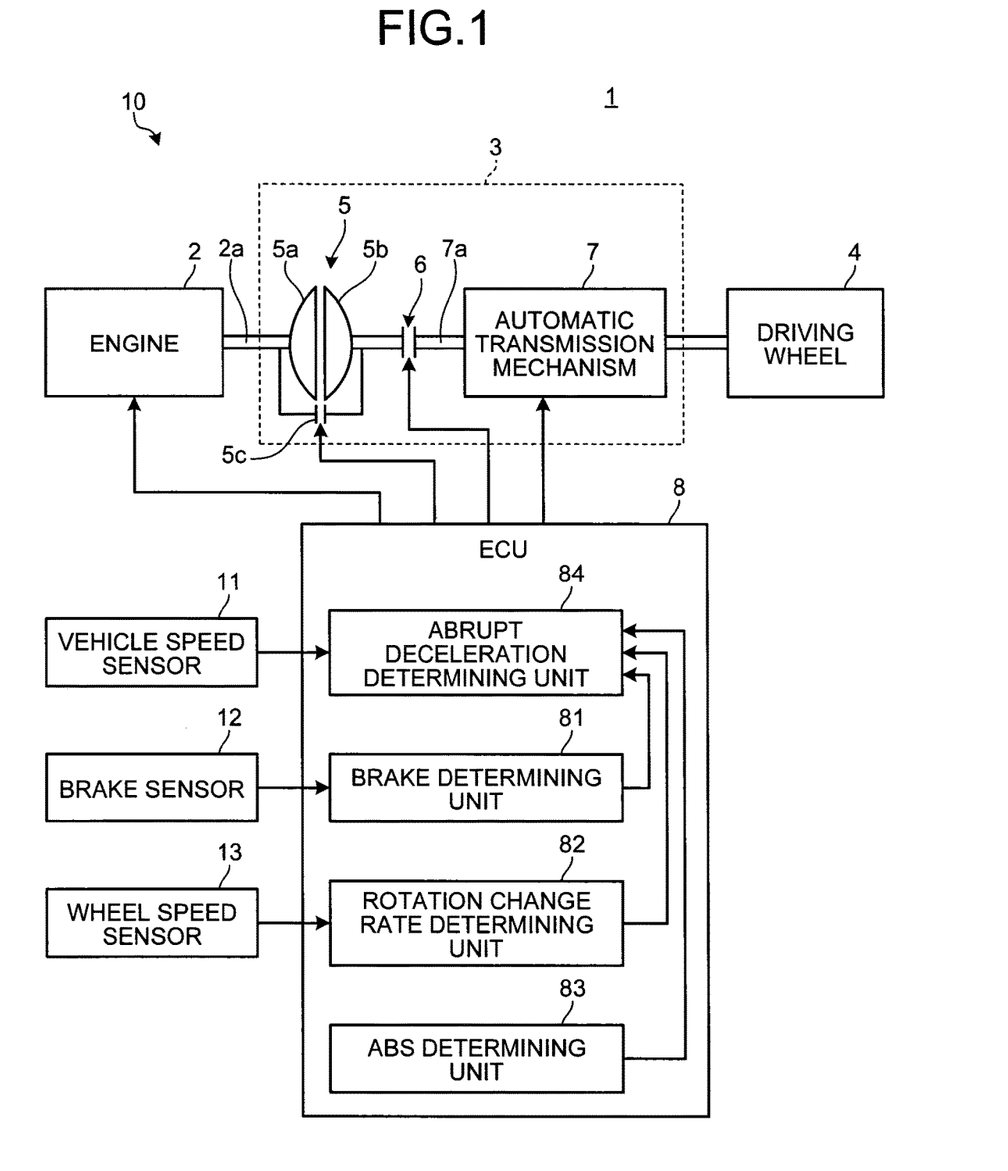
FIG. 1 is a view illustrating a schematic arrangement of a vehicle controller according to a first embodiment of the present invention.

A first embodiment of the present invention will be explained referring to FIGS. 1 to 5. First, referring to FIG. 1, a configuration of a vehicle controller 10 according to the first embodiment will be explained. FIG. 1 is a view illustrating a schematic arrangement of the vehicle controller according to the first embodiment of the present invention.

As illustrated in FIG. 1, the vehicle controller 10 is mounted on a vehicle 1. The vehicle 1 includes an engine 2, a transmission 3, and driving wheels 4. The engine 2 is an internal combustion engine as a traveling drive source of the vehicle 1 and a driving force is controlled according to a fuel injection amount. The transmission 3 acts as a power transmission mechanism for transmitting the driving force generated by the engine 2 to the driving wheels 4 side. The driving wheels 4 are rotated by the driving force of the engine 2 transmitted via the transmission 3 and can cause the vehicle 1 to travel forward or rearward.

The transmission 3 includes a torque converter 5, a clutch 6, and an automatic transmission mechanism 7. Engine output torque (power) of the engine 2 is input to the automatic transmission mechanism 7 from an engine output shaft 2a via the torque converter 5 and the clutch 6 and transmitted to the driving wheels 4 from the automatic transmission mechanism 7 via, for example, a not illustrated deceleration mechanism and a differential gear.

The torque converter 5 has a pump impeller 5a connected to the engine output shaft 2a and a turbine runner 5b connected to an input shaft 7a of the automatic transmission mechanism 7. The pump impeller 5a is an input member to which power is input from the engine 2 in the torque converter 5. The turbine runner 5b is an output member from which the power input from the engine 2 is output in the torque converter 5.

The torque converter 5 can transmit the power between the pump impeller 5a and the turbine runner 5b via a working fluid. The torque converter 5 has a lock-up clutch 5c. The lock-up clutch 5c is a friction engaging type clutch device disposed in a power transmission path of the engine 2 and the driving wheels 4. The lock-up clutch 5c can connect the engine output shaft 2a and the input shaft 7a without via the working fluid. When the lock-up clutch 5c is disengaged, the torque converter 5 can transmit the power between the engine output shaft 2a and the input shaft 7a via the working fluid and, when the lock-up clutch 5c is engaged, the pump impeller 5a and the turbine runner 5b are directly coupled with each other so that the power can be directly transmitted between the engine output shaft 2a and the input shaft 7a without via the working fluid.

The clutch 6 is disposed to the input shaft 7a and disposed in series with the lock-up clutch 5c in the power transmission path. The clutch 6 has a function for connecting and disconnecting the power transmission path of the engine 2 and the driving wheels 4. The clutch 6 has engine side engaging elements coupled with the engine 2 side and the driving-wheel side engaging elements coupled with the driving wheels 4 side in the input shaft 7a. The clutch 6 can connect the power transmission path of the engine 2 and the driving wheels 4 by engaging the engine side engaging elements with the driving-wheel side engaging elements. In contrast, the clutch 6 can disconnect the power transmission path of the engine 2 and the driving wheels 4 by being disengaged. In other words, the clutch 6 functions as a switching device for switching a power transmission possible state and a power transmission impossible state in the power transmission path of the engine 2 and the driving wheels 4.

The automatic transmission mechanism 7 is an automatic transmission for automatically changing a gear shift ratio (a gear shift stage, a gear stage) according to a traveling state of the vehicle 1 and can be applied with various automatic transmissions, for example, a stepped automatic transmission (AT) such as a planetary gear type and parallel spur-gear type transmissions, a semiautomatic transmission such as a dual clutch transmission (DCT), a multi-mode manual transmission (MMT), and a continuously variable transmission (CVT) such as a sequential manual transmission (SMT), and a belt type or toroidal type transmission.

Respective portions of the vehicle 1 such as the engine 2 and the transmission 3 (the lock-up clutch 5c, the clutch 6, and the automatic transmission mechanism 7) are controlled by an ECU 8 (Electronic Control Unit) based on information of various sensors in the vehicle 1.

The ECU 8 is configured to be able to execute a lock-up control for controlling an engagement/disengagement of the lock-up clutch 5c of the torque converter 5 and improve fuel economy by, for example, slip engaging the lock-up clutch 5c at the time of deceleration. Further, the ECU 8 is configured to be able to abruptly disengage the lock-up clutch 5c by interrupting the execution of the lock-up control when the vehicle 1 is abruptly decelerated. When the lock-up clutch 5c is engaged at the time the vehicle 1 has been abruptly decelerated, since a reverse input is directly transmitted from the driving wheels 4 sides to the engine 2 side, there is a fear that an engine stall occurs. To cope with the problem, the engine stall can be prevented by abruptly disengaging the lock-up clutch 5c at the time of abrupt deceleration.

When no acceleration/deceleration request is issued to the vehicle 1 at the time of traveling, the ECU 8 can execute a so-called economic run control that can improve fuel economy by causing the vehicle 1 to travel by inertia by disengaging the clutch 6 and interrupting the power transmission between the engine 2 and the driving wheels 4. Further, the ECU 8 can improve brake efficiency when the vehicle 1 decelerates abruptly by interrupting the economic run control engaging the clutch 6 by starting the engine 2, and using an engine brake.

Further, in the embodiment, the ECU 8 is configured to be able to execute an ABS (Antilock Brake System) control. The ABS control is such a function that the ABS control can avoid the vehicle 1 from being slipped by individually controlling brake forces of brake devices (illustration omitted) disposed to the respective wheels when, for example, wheels of the vehicle 1 have been locked at the time a brake is applied abruptly or the brake is operated during traveling on a road having a low friction coefficient.

In particular, in the embodiment, the ECU 8 is configured to be able to determine whether or not an abrupt deceleration state is generated using plural abrupt deceleration determining methods so that the lock-up control and the economic run control can be appropriately interrupted by accurately determining an abrupt deceleration state of the vehicle 1. Specifically, the ECU 8 uses three types of abrupt deceleration determining methods, i.e. (1) an abrupt deceleration determining method (brake determining method) based on brake operation information, (2) an abrupt deceleration determining method (a rotation change rate determining method) based on a change rate (a deceleration rate) of each wheel speed, and (3) an abrupt deceleration determining method (an ABS determining method) based on an operation state of the ABS control. The ECU 8 is configured to be able to select any one of the plural abrupt deceleration determining methods according to information as to a traveling state of the vehicle 1, specifically according to the vehicle speed and use the selected method to the abrupt deceleration determination.

In the embodiment, "abrupt deceleration" is intentionally used to express a state that the brake operation is executed by a brake force having magnitude by which the wheels are locked. The abrupt deceleration state is generated by, for example, an abrupt brake operation by a driver and a brake operation when a road surface friction coefficient (a road surface μ) is low.

In the components according to the embodiment, the ECU 8 is connected to a vehicle speed sensor 11, a brake sensor 12, and a wheel speed sensor 13 and further connected to the engine 2 and the transmission 3 (the lock-up clutch 5c, the clutch 6, and the automatic transmission mechanism 7).

The vehicle speed sensor 11 detects a travel speed of the vehicle 1.

The brake sensor 12 detects an operation amount to a brake pedal. The brake sensor 12 can detect the operation amount to the brake pedal based on, for example, a pedal stroke of the brake pedal and a depression force input to the brake pedal.

The wheel speed sensor 13 detects rotation speeds (wheel speeds) of the wheels (the driving wheels 4) of the vehicle 1. The wheel speed sensor 13 can detect the wheel speeds based on, for example, numbers of rotations of shafts coupled with the driving wheels 4. Since the vehicle speed corresponds to the wheel speeds, the vehicle speed can be detected based on the rotation speeds of the respective wheels of the vehicle 1. Thus, the vehicle speed and the wheel speeds may be detected by the wheel speed sensor 13 without separately providing the wheel speed sensor 13 and the vehicle speed sensor 11.

The ECU 8 selects a determining method for determining the abrupt deceleration based on the input information from the vehicle speed sensor 11, the brake sensor 12, and the wheel speed sensor 13 and determines whether or not an abrupt deceleration operation has been executed. At the time of the abrupt deceleration determination, the engine is restarted and the clutch is engaged by disengaging the lock-up clutch by interrupting the lock-up control or interrupting the economic run control.

Specifically, as illustrated in FIG. 1, the ECU 8 is configured to realize respective functions of a brake determining unit 81 (a second abrupt deceleration determining means), a rotation change rate determining unit 82 (a rotation change rate determining means, a first abrupt deceleration determining means), an ABS determining unit 83 (an ABS determining means, a first abrupt deceleration determining means), an abrupt deceleration determining unit 84.

The brake determining unit 81 executes the abrupt deceleration determination based on the brake operation information detected by the brake sensor 12. Note that "the brake operation information" includes a brake operation amount or a brake operation speed. When the brake operation information has exceeded a predetermined threshold value, the brake determining unit 81 can determine that the abrupt deceleration state has been generated. The brake determining unit 81 is a function for executing (1) the brake determining method of the plural abrupt deceleration determining methods described above. When the brake determining unit 81 determines that the abrupt deceleration state has been generated, the brake determining unit 81 sets up a flag dbkqd showing a result of determination of the abrupt deceleration based on the brake operation (dbkqd=1). When the abrupt deceleration state has not been generated, the state is shown by dbkqd=0.

The rotation change rate determining unit 82 calculates a rotation change rate of each wheel, i.e. a change amount (a deceleration) of each wheel speed based on each wheel speed detected by the wheel speed sensor 13 and executes the abrupt deceleration determination based on the change amount of each wheel speed. When the change amount of each wheel speed has exceeded a predetermined threshold value, the rotation change rate determining unit 82 can determine that the abrupt deceleration state has been generated. The rotation change rate determining unit 82 is a function for executing (2) the rotation change rate determining method of the plural abrupt deceleration determining methods described above. When the rotation change rate determining unit 82 determines that the abrupt deceleration state has been generated, the rotation change rate determining unit 82 sets up a flag dnoqd showing a result of determination of the abrupt deceleration determination based on the rotation change rate of each wheel (dnoqd=1). When the abrupt deceleration state has not been generated, the state is shown by dnoqd=0.

The ABS determining unit 83 executes the abrupt deceleration determination based on whether or not the ABS control has been executed. When the ABS control has been executed by the ECU 8, the ABS determining unit 83 can determine that the abrupt deceleration state has been generated. The ABS determining unit 83 is a function for executing (3) the ABS determining method of the plural abrupt deceleration determining methods described above. When the ABS determining unit 83 determines that the ABS has operated and the abrupt deceleration state has been generated, the ABS determining unit 83 sets up a flag absact showing a result of determination of the abrupt deceleration based on the operation state of the ABS (absact=1). When the ABS has not operated and the abrupt deceleration state has not been generated, the state is shown by absact=0.

The abrupt deceleration determining unit 84 selects one of the plural abrupt deceleration determining methods and executes the abrupt deceleration determination. The abrupt deceleration determining unit 84 determines to use any determining method of the brake determining unit 81, the rotation change rate determining unit 82, and the ABS determining unit 83 based on the vehicle speed detected by the vehicle speed sensor 11.

Figure 2:
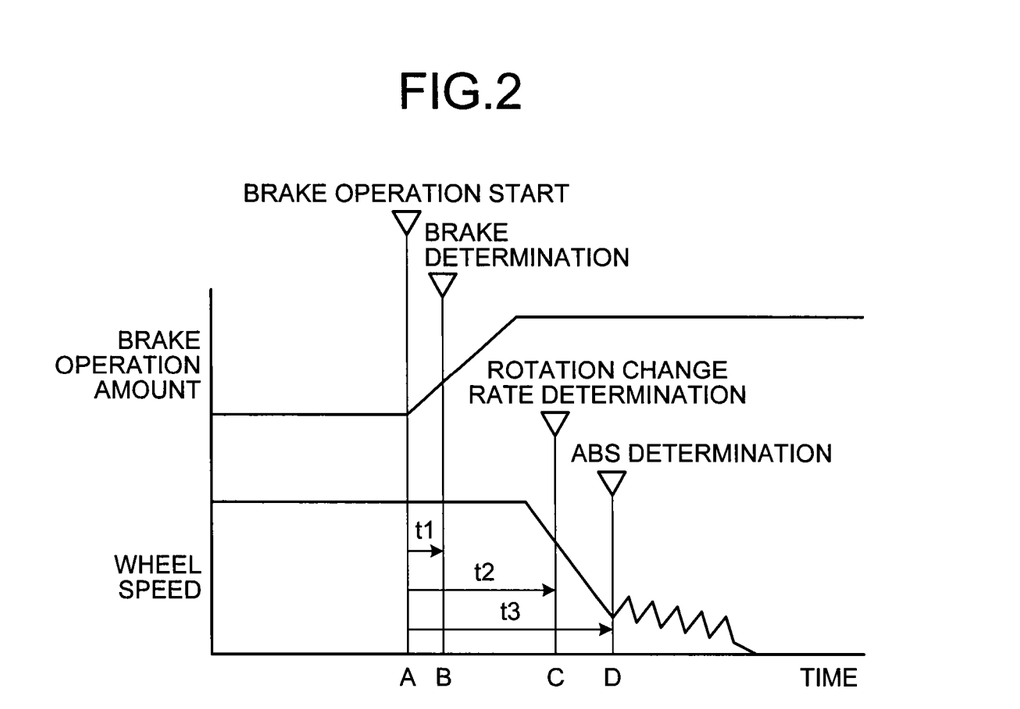
FIG. 2 is a time chart illustrating respective necessary determination times of plural abrupt deceleration determining methods used in the first embodiment.
Figure 3:
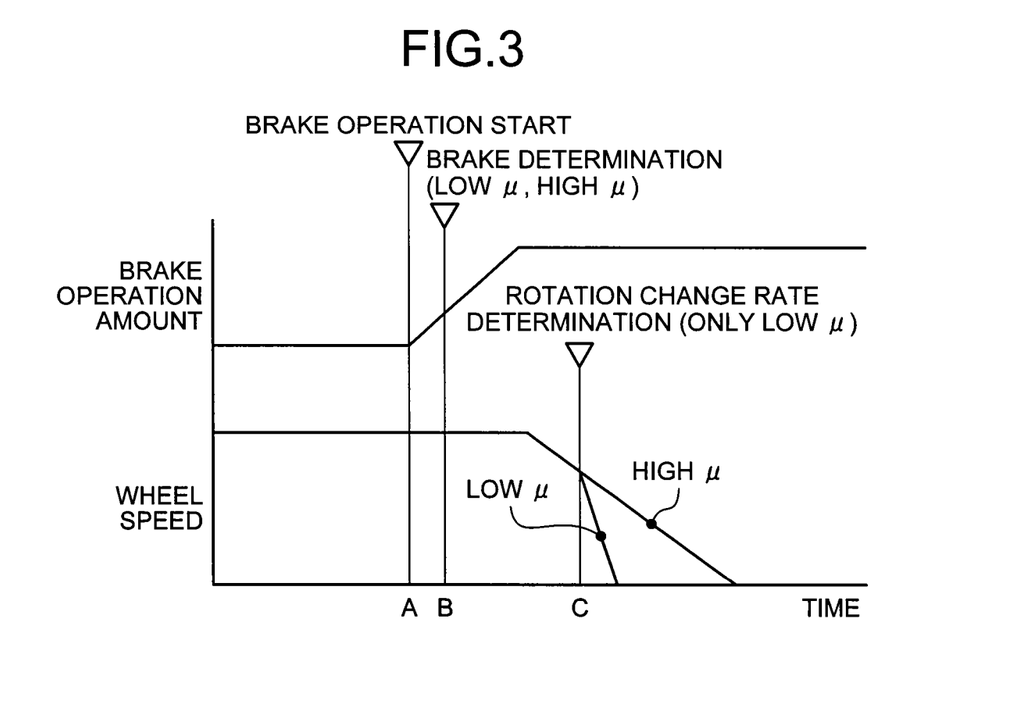
FIG. 3 is a time chart explaining a brake determining method of the abrupt deceleration determining methods used in the first embodiment.
Figure 4:
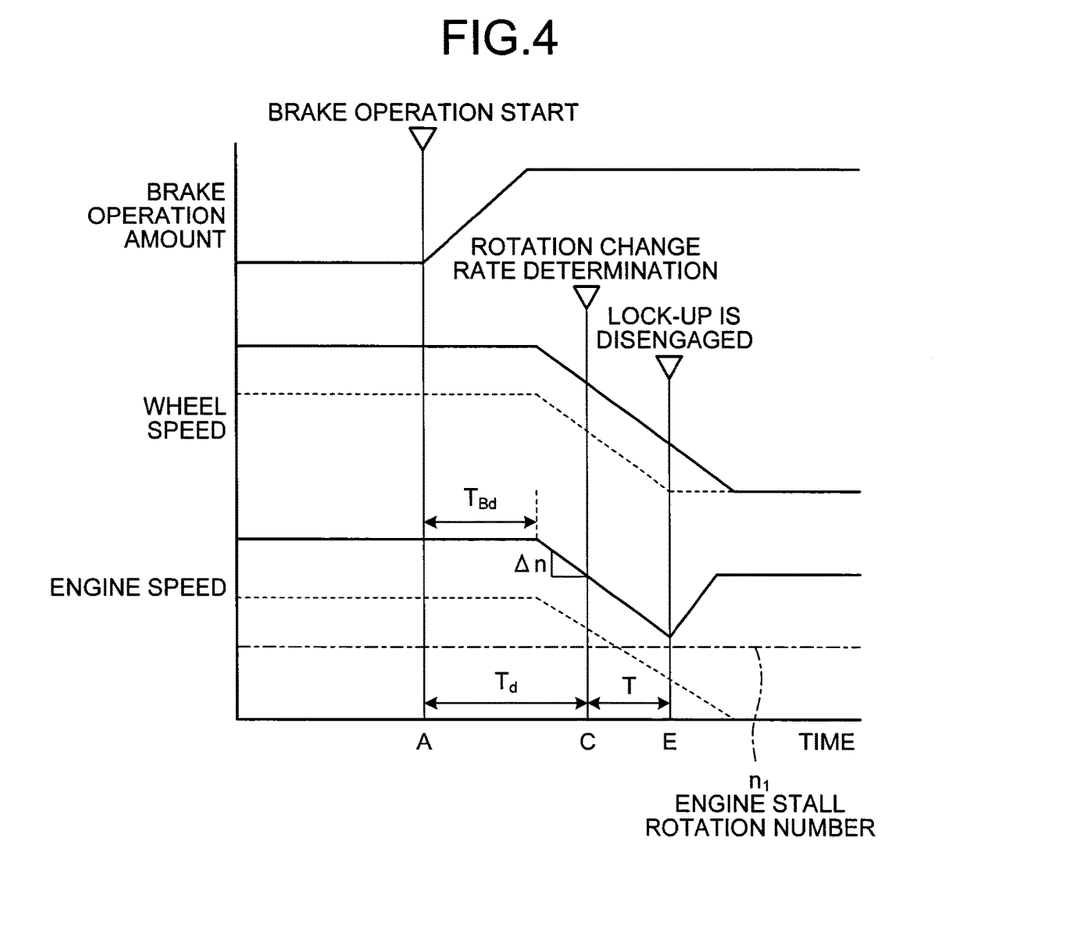
FIG. 4 is a time chart explaining a rotation change rate determining method of the abrupt deceleration determining methods used in the first embodiment.

How the ECU 8 (the abrupt deceleration determining unit 84) of the embodiment selects a determining method according to the vehicle speed will be explained referring to FIGS. 2 to 4. FIG. 2 is a time chart illustrating respective necessary determination times of the plural abrupt deceleration determining methods used in the embodiment, FIG. 3 is a time chart explaining the brake determining method of the abrupt deceleration determining methods used in the embodiment, and FIG. 4 is a time chart explaining the rotation change rate determining method of the abrupt deceleration determining methods used in the embodiment.

The timing chart of FIG. 2 illustrates a brake operation amount at the time of brake operation and a time transition of a wheel speed, respectively. As illustrated in FIG. 2, when a brake operation starts at a time A, the brake operation amount increases, and at a time B at which the brake operation amount has exceeded a predetermined threshold value, the brake determining method determines that the abrupt deceleration state has been generated. A required time from the brake operation start time A to a time B at which the abrupt deceleration has been determined by the brake determining method is t1.

When the wheel speeds begin to decrease by the brake operation thereafter, at a time C at which the change amounts (decelerations) of the wheel speeds have exceeded a predetermined threshold value, the abrupt deceleration state is determined by the rotation change rate determining method. A required time from the brake operation start time A to the time C at which the abrupt deceleration has been determined by the rotation change rate determining method is t2.

Further, at a time D at which the wheel speeds have decreased, the wheels have become a locked state, and the ABS control is executed by the ECU 8, the abrupt deceleration state is determined by the ABS determining method. A required time from the brake operation start time A to the time D at which the abrupt deceleration has been determined by the ABS determining method is t3.

In this way, a relation of the required times until of the abrupt deceleration determination by the respective determining methods is t1<t2<t3. The brake determining method can execute abrupt deceleration determination at earliest timing and the determination is executed sequentially later in the order of the rotation change rate determining method and the ABS determining method. From the view point of rapidity of the abrupt deceleration determination, it can be said that the brake determining method is optimum.

However, the brake determining method based on the brake operation amount has a disadvantage in that determination accuracy is low, although the method can determine a generation of the abrupt deceleration in a time shorter than the other determining methods. This will be explained referring to FIG. 3. FIG. 3 is a time chart illustrating a difference of variations of wheel speeds according to a road surface $\mu$ at the time of the brake operation. Likewise FIG. 2, the time chart of FIG. 3 illustrates a brake operation amount at the time of brake operation and a time transition of a wheel speed respectively, and further as to the wheel speed, FIG. 3 illustrates respective time transitions when a traveling road surface is low $\mu$ (a friction coefficient is low) and high $\mu$ (the friction coefficient is high). The transitions of the wheel speeds correspond to the same brake operation.

As illustrated in FIG. 3, in the case of the high $\mu$, the wheel speed changes more gently than the case of the low $\mu$. Thus, there may arise in the case where a wheel is not locked and the abrupt deceleration state is not generated in the high $\mu$ even in a brake operation amount corresponding to a brake force that will lock the wheel in the low $\mu$. That is, there is considered a status that the abrupt deceleration state may be generated or may not be generated even by the same brake operation depending on a friction coefficient $\mu$ of a road surface on which a vehicle travels.

In view of the status, when the abrupt deceleration is determined based on the brake operation information, it is necessary to set a determination threshold value attaching importance to the low $\mu$ in which the abrupt deceleration is actually generated. In an example illustrated in FIG. 3, although the brake determining method executes the abrupt deceleration determination at the time B referring only to the brake operation amount, at this time, a determination reference (the threshold value) is set small so that the abrupt deceleration can be securely determined in the low $\mu$ in which the abrupt deceleration state is actually generated. For this reason, even in the case of the high $\mu$ in which the abrupt deceleration state is not actually generated, the case is unnecessarily determined as the abrupt deceleration state. When a brake operation, by which the abrupt deceleration state may be generated, is executed in the low $\mu$, any of the abrupt deceleration states generated in the low $\mu$ is determined as the abrupt deceleration state regardless of a state of the road surface $\mu$, which leads to an erroneous determination.

In contrast, since the determining method based on the rotation change rate executes the abrupt deceleration determination referring to the change rate of each wheel speed at the time C, the method determines that the abrupt deceleration has not been generated in the high μ and can determine a generation of the abrupt deceleration state only in the low μ. Further, although not illustrated in FIG. 3, since the ABS determining method determines a generation of the abrupt deceleration state when the wheels are locked and the ABS control is executed, in the example of FIG. 3, the method can determine that the abrupt deceleration state is generated only in the low μ although this a matter of course.

As described above, although the brake determining method based on the brake operation amount can execute the determination in a shorter time than the other determining methods, the method has the disadvantage in that the determination accuracy is low.

In contrast, although the rotation change rate determining method based on the change amount of each wheel speed has high determination accuracy, since the required time of the determination is long as described above, the method may adversely affect drivability depending on a driving state of the vehicle. This will be explained referring to FIG. 4. FIG. 4 is a time chart illustrating a behavior at the time of an abrupt deceleration determination by the rotation change rate determining method at the time of brake operation. The time chart of FIG. 4 illustrates time transitions of a brake operation amount, a wheel speed, and an engine speed at the time of the brake operation, respectively. Further, FIG. 4 illustrates a behavior when the wheel speed and the engine speed are relatively large to the same brake operation by solid lines and a behavior when they are low thereto by broken lines.

Likewise FIGS. 2 and 3, also in the time chart of FIG. 4, the brake operation is started at a time A, the wheel speed and the engine speed decreases, and the abrupt deceleration is determined by the rotation change rate determining method at a time C at which the change amount of the wheel speed has exceeded a predetermined threshold value.

As described above, the ECU 8 interrupts the economic run control and the lock-up control in order to keep the traveling state of the vehicle stably according to the abrupt deceleration determination. An example of FIG. 4 refers to the lock-up control and as illustrated in FIG. 4, the ECU 8 interrupts the lock-up control and disengages the lock-up clutch at a time E after the abrupt deceleration determination. An operation time T is required from the abrupt deceleration determination at the time C to the lock-up disengagement at the time E due to an influence of a hydraulic pressure delay and a piston operation time.

As illustrated by the solid lines in FIG. 4, when the wheel speed and the engine speed are relatively large, since the engine speed becomes higher than an engine stall rotation number n1 in a period until lock-up is disengaged at the time E, the engine is not stalled. After the lock-up has been disengaged, since the engine does not receive load torque resulting from the abrupt deceleration from the driving-wheel sides, the engine speed is recovered.

In contrast, as illustrated by the broken lines in FIG. 4, when the wheel speed and the engine speed are relatively small, since the engine speed becomes lower than the engine stall rotation number n1 in the period until lock-up is disengaged at the time E, the engine is stalled before the lock-up is disengaged.

As described above, in a low vehicle speed region in which the wheel speed and the engine speed are low, there is a fear that the rotation change rate determining method may cause an adverse effect to drivability such as an occurrence of an engine stall after the abrupt deceleration has been determined. Further, since the ABS determining method determines the abrupt deceleration after the wheels have been locked and the ABS control has been operated, the method requires a longer determination time than the rotation change rate determining method and is more unsuitable for a use in the low vehicle speed region.

Taking what has been described above into consideration, the embodiment is configured such that the rotation change rate determining method that has the long determination time although having the high accuracy is used on the high vehicle speed side and the brake determining method that has the short determination time although having a lowered accuracy is used on the low vehicle speed side so that a deterioration of fuel economy due to an unnecessary abrupt deceleration determination can be prevented and a fuel economy effect can be maximized by suppressing the engine stall. In other words, the brake determining method is selected in the low speed region and the rotation change rate determining method or the ABS determining method is selected in the high speed region according to a vehicle speed at the time the brake operation starts.

When, for example, the rotation change rate determining method is used, a boundary value of the vehicle speed for properly using the brake determining method and the rotation change rate determining method may be set to a lower limit value at which the engine speed reaches the engine stall rotation number n1 at the time E at which lock-up is disengaged after the abrupt deceleration has been determined. When the vehicle speed at the time the brake operation starts becomes higher than the lower limit value, the rotation change rate determining method is selected, whereas when the vehicle speed becomes lower than the lower limit value, the brake determining method is selected.

An example of a decision method of the lower limit value of the vehicle speed will be explained referring to FIG. 4. The engine speed is taken into consideration as information corresponding to the vehicle speed. As illustrated in FIG. 4, a time from the time A at which the brake operation starts to a time at which a vehicle speed (a wheel speed, an engine speed) starts to actually decelerate is shown by TBd. TBd is a fixed parameter depending on a structure of a vehicle, etc. Further, a required time from the time A at which the brake operation starts to the time C at which the abrupt deceleration is determined by the rotation change rate determining method is shown by Td. A required time from the time C at which the abrupt deceleration determination is executed to the time E at which the locked up clutch is actually disengaged is shown by T. T is a fixed parameter depending on a structure of a lock-up control system, etc. Further, a change rate of the engine speed resulting from the brake operation is shown by Δn. The symbol Δn is a fixed parameter set under the strictest condition (maximum abrupt braking) although it varies depending on how a brake is depressed.

At the time when the engine speed at the time A at which the brake operation starts is shown by n, the engine speed at the time E at which the locked up clutch is disengaged can be shown by n−Δn(Td−TBd+T). To use the rotation change rate determining method, since it is sufficient that the engine speed is equal to or larger than the engine stall rotation number n1 when lock-up is disengaged, the following Expression (1) can be used as a conditional expression.

$$n-\Delta n(Td-TBd+T) \geq n1 \quad (1)$$

When Expression (1) is satisfied, the rotation change rate determining method can be used, whereas when Expression (1) is not satisfied, the brake determining method is used. Specifically, a vehicle speed spdth2, which corresponds to an engine speed n at which a left side member of Expression (1) becomes equal to a right side member thereof, can be used as a threshold value for properly using the brake determining method and the rotation change rate determining method. The threshold value spdth2 is a lower limit speed at the time A at which the brake operation starts and is necessary to prevent the engine stall when the abrupt deceleration is determined by the rotation change rate determining method.

In contrast, when the wheels are locked and the ABS control operates, since a rotation change behavior of a rotation axis of the power transmission path becomes unstable and the wheel speed also minutely vibrates as illustrated in FIG. 2, the rotation change rate determining method based on the change rate of each wheel speed may fail to determine the abrupt deceleration. In particular, in a high vehicle speed region, since the ABS operates before the rotation change rates exceed a threshold value depending on the road surface μ, there is a possibility that the abrupt deceleration determination cannot be executed.

Under such condition, the abrupt deceleration determination can be executed by using the ABS determining method in place of the rotation change rate determining method. The boundary value of the vehicle speed for properly using the rotation change rate determining method and the ABS determining method can be set to the vehicle speed spdth1 at which there is a possibility that the ABS control operates prior to an rotation number variation method at the time of, for example, abrupt braking. When the vehicle speed at the time A at which the brake operation starts is larger than the threshold value spdth1, the ABS determining method is used, whereas when the vehicle speed is smaller than the threshold value spdth1, the rotation change rate determining method is used. Note that spdth1 is set at least larger than spdth2 (on a high speed side).

Returning to FIG. 1, the abrupt deceleration determining unit 84 uses the two threshold values spdth1 (hereinafter, called a first threshold value) and spdth2 (hereinafter, called a second threshold value) set as described above and executes the abrupt deceleration determination by selecting the brake determining method when the vehicle speed detected by the vehicle speed sensor 11 is smaller than the second threshold value spdth2, selecting the rotation change rate determining method when the vehicle speed is between the second threshold value spdth2 and the first threshold value spdth1, and selecting the ABS determining method when the vehicle speed is larger than the first threshold value spdth1.

The ECU 8 is physically an electronic circuit mainly composed of a known microcomputer including a CPU (Central Processing Unit), a RAM (Random Access Memory), a ROM (Read Only Memory), and an interface, etc. Functions of respective portions of the ECU 8 illustrated in FIG. 1 are realized by operating various types of devices in the vehicle 1 under the control of the CPU by loading an application program held in the ROM on the RAM and causing the CPU to execute the program and reading and writing data from and to the RAM and the ROM.

Further, the ECU 8 includes other various functions which are used by the ECU 8 as an ECU of the vehicle 1 in addition to the functions of the respective portions. Further, the ECU 8 may include plural ECUs such as an engine ECU for controlling the engine 2, a T/M-ECU for controlling the transmission 3, and an S & S-ECU for executing the economic run control (S & S (start & stop) control).

In the configuration of the vehicle 1 described above, the vehicle controller 10 of the embodiment includes the ECU 8, the engine 2, and the transmission 3 (the lock-up clutch 5c, the clutch 6).

Figure 5:
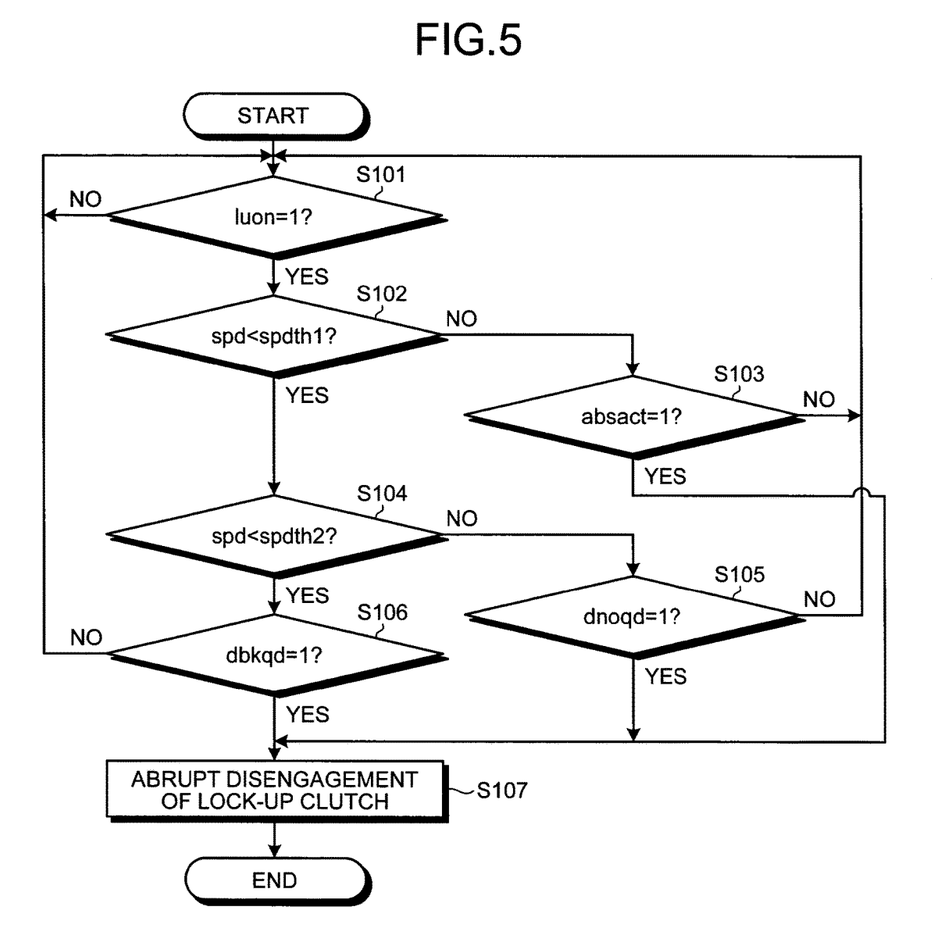
FIG. 5 is a flowchart illustrating an abrupt deceleration determining process and an abrupt deceleration processing control by the vehicle controller according to the first embodiment of the present invention.

Next, referring to FIG. 5, an operation of the vehicle controller 10 according to the embodiment will be explained. FIG. 5 is a flowchart illustrating an abrupt deceleration determining process and an abrupt deceleration processing control by the vehicle controller according to the first embodiment of the present invention. A flow illustrated in FIG. 5 is executed by the ECU 8 at, for example, every predetermined cycle.

First, a lock-up control state is determined (S101). Specifically, whether or not lock-up ON (luon=1) is confirmed. Lock-up ON/OFF shows a state that the lock-up clutch is engaged or disengaged. When, lock-up ON (luon=1), the ECU 8 goes to step S102, whereas when lock-up OFF (luon=0), the ECU 8 holds until becoming luon=1.

When lock-up ON (luon=1) is determined at step S101, whether or not a vehicle speed spd obtained by the vehicle speed sensor 11 is smaller than the first threshold value spdth1 is confirmed by the abrupt deceleration determining unit 84 (S102). When the vehicle speed spd is smaller than the first threshold value spdth1, the ECU 8 goes to step S104, whereas when the vehicle speed spd is equal to or larger than the first threshold value spdth1, the ECU 8 goes to step S103.

When the vehicle speed spd is equal to or larger than the first threshold value spdth1 at step S102, the abrupt deceleration determination is executed based on the ABS operation (S103). Specifically, the abrupt deceleration determining unit 84 confirms a flag absact showing a result of the abrupt deceleration determination based on the operation state of the ABS that is executed by the ABS determining unit 83. When absact=1, since the ABS control is operated and the ABS determining unit 83 determines that the abrupt deceleration has been generated, the ECU 8 interrupts the lock-up control, abruptly disengages the lock-up clutch (S107), and finishes the process. In contrast, when absact=0, since the ABS control is not operated and the abrupt deceleration has not been generated, the ECU 8 returns to step S101 and continues the process.

When the vehicle speed spd is smaller than the first threshold value spdth1 at step S102, next, it is confirmed whether or not the vehicle speed spd is smaller than the second threshold value spdth2 (S104). When the vehicle speed spd is smaller than the second threshold value spdth2, the ECU 8 goes to step S106, whereas when the vehicle speed spd is equal to or larger than the second threshold value spdth2, the ECU 8 goes to step S105.

When the vehicle speed spd is equal to or larger than the second threshold value spdth2 at step S104, i.e. when the vehicle speed spd is equal to or larger than the second threshold value spdth2 and smaller than the first threshold value spdth1 (spdth2≤spd<spdth1), the abrupt deceleration determination is executed based on the change amount (the deceleration) of each wheel speed (S105). Specifically, the abrupt deceleration determining unit 84 confirms the flag dnoqd showing a result of determination based on the change amount (the deceleration) of each wheel speed executed by the rotation change rate determining unit 82. When dnoqd=1, since the rotation change rate determining unit 82 determines that the abrupt deceleration has been generated, the ECU 8 interrupts the lock-up control, abruptly disengages the lock-up clutch (S107), and finishes the process. In contrast, when dnoqd=0, since the rotation change rate determining unit 82 does not determine the abrupt deceleration, the ECU 8 returns to step S101 and continues the process.

When the vehicle speed spd is smaller than the second threshold value spdth2 at step S104, the abrupt deceleration determination is executed based on the brake operation information (S106). Specifically, the abrupt deceleration determining unit 84 confirms the flag dbkqd showing a result of abrupt deceleration determination based on the brake operation executed by the brake determining unit 81. When dbkqd=1, since the brake determining unit 81 determines that the abrupt deceleration has been generated, the ECU 8 interrupts the lock-up control, abruptly disengages the lock-up clutch (S107), and finishes the process. In contrast, when dbkqd=0, since the brake determining unit 81 does not determine the abrupt deceleration, the ECU 8 returns to step S101 and continues the process.

An interrupt process of the economic run control can also be executed by the same configuration as the aforementioned flowchart. It is sufficient, for example, to change step S101 to a determining process for determining, whether or not the economic run control is being executed and to change step S107 to an operation process for engaging the clutch resulting from an interrupt of the economic run control.

Next, an function and effect of the vehicle controller 10 of the embodiment will be explained.

According to the vehicle controller 10 of the embodiment, the ECU 8 includes the brake determining unit 81 for determining the abrupt deceleration operation based on the brake operation information of the vehicle 1, the rotation change rate determining unit 82 for determining the abrupt deceleration based on the rotation change rate of each wheel, and the ABS determining unit 83 for determining the abrupt deceleration based on an operating state of the ABS. The brake determining unit 81 has the required time of the abrupt deceleration determination shorter in comparison with the rotation change rate determining unit 82 and the ABS determining unit 83. The brake determining unit 81 is used in a region where the vehicle speed of the vehicle 1 is lower than the rotation change rate determining unit 82 and the ABS determining unit 83 are used (in more detail, the abrupt deceleration determination is executed by selecting the brake determining unit 81 when the vehicle speed detected by the vehicle speed sensor 11 is smaller than the second threshold value spdth2, selecting the rotation change rate determining unit 82 when the vehicle speed is between the second threshold value spdth2 and the first threshold value spdth1, and selecting the ABS determining unit 83 when the vehicle speed is larger than the first threshold value spdth1).

Although the embodiment has the plural abrupt deceleration determining methods, the information used by the respective methods for the abrupt deceleration determination is the information, such as the brake operation information, the rotation change rate of each wheel, and the operating state of the ABS, different in a required time and accuracy of the determination. Thus, reliabilities of the plural abrupt deceleration determining methods are variable depending on the driving state of the vehicle 1. When an improper abrupt deceleration determining method is selected in a certain driving state, there is a fear that the fuel economy and the drivability are deteriorated by an increase of erroneous determination and an occurrence of the engine stall. To cope with the problem, the embodiment uses the vehicle speed as the information as to the driving state of the vehicle and uses the vehicle speed as a determination reference for selecting an abrupt deceleration determining method from the plural abrupt deceleration determining methods. This makes it possible to execute an optimum abrupt deceleration determination according to the driving state of the vehicle with a result that an accuracy of the abrupt deceleration determination can be improved.

Modification of First Embodiment

Although the embodiment uses the vehicle speed showing the driving state of the vehicle as the determination reference for selecting the abrupt deceleration determining methods, information other than the above information may be used and, for example, a lateral acceleration (a lateral G) may be used.

Figure 6:
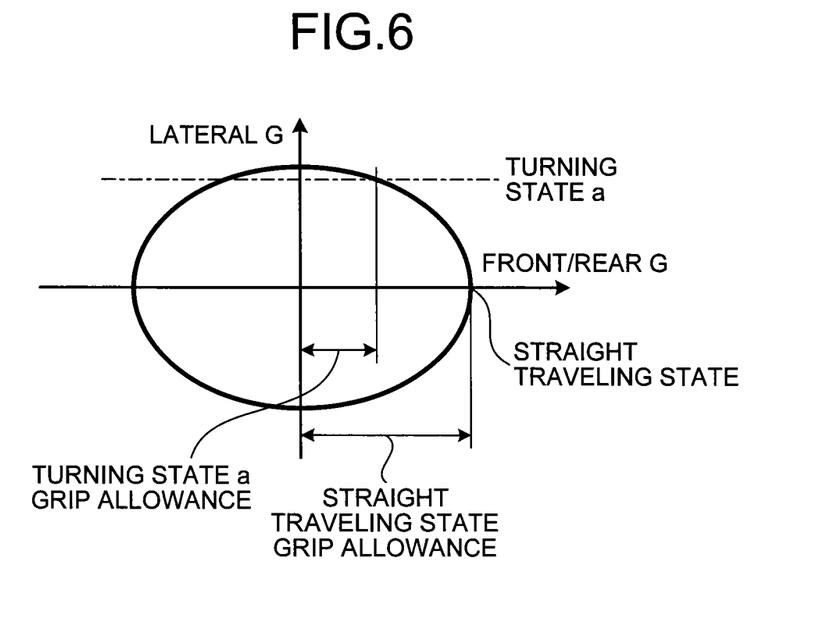
FIG. 6 is a view illustrating an example of a tire friction circle.

In a state that a vehicle 1 turns, the lateral G varies according to, for example, R of a curve and an approach speed and a steering amount. A change amount of a front/rear G allowed by a tire also changes from a relation of a friction circle of a tire. FIG. 6 is a view illustrating an example of the friction circle of the tire. In FIG. 6, a horizontal axis shows a front/rear G, a vertical axis shows a lateral G, and a circle shown by a thick line in the figure shows a grip limit of a tire. Specifically, when a drive operation for causing a relation between a front/rear G and a lateral G received by a vehicle to be positioned externally of the circle (on a side not including an origin), the tire of the vehicle slips. Further, the drive operation positioned on the horizontal axis is a straight traveling state in which no lateral G is received.

As illustrated in FIG. 6, when, for example, the vehicle becomes a turning state a, a grip allowance is decreased by a generation of the lateral G to a grip allowance capable of securing the straight traveling state. Since it is preferable to decrease a disturbance to the tire as far as possible during turning, it is preferable to execute the abrupt deceleration determination (the brake determining method) by the brake operation information having the short required time and to be able to interrupt the lock-up control and the economic run control before a behavior of the tire becomes unstable. However, since decreasing a threshold value for the abrupt deceleration determination in consideration of the grip allowance at the time of turning causes an erroneous determination to be likely to occur in the straight traveling state, there is a fear that the fuel economy increases due to a return to an unnecessary fuel injection by interrupting the economic run.

At the time the lateral G is used as the determination reference for selecting the abrupt deceleration determining methods, when it is determined that the lateral G is large, the ECU 8 executes the abrupt deceleration determination (the brake determining method) by the brake operation information, whereas when it is determined that the lateral G is small, the ECU 8 executes the abrupt deceleration determination (the rotation change rate determining method) by the rotation change rates. With the operations, a vehicle stabilizing performance can be secured in the vicinity of a tire friction limit while decreasing the fuel economy.

The road surface μ may be used as the determination reference for selecting the abrupt deceleration determining methods likewise. As explained referring to FIG. 3, since even the same brake operation makes a behavior of the wheel speeds different according to a magnitude of the road surface μ, a change amount of the front/rear G that can be allowed by the tire changes. When the height of the road surface μ becomes higher, the friction circle of FIG. 6 becomes bigger externally and the grip allowance also increases, whereas when the height of the road surface μ becomes lower, the friction circle down-scales in an origin direction and the grip allowance also decreases. Thus, in the case, when it is determined that the road surface μ is high, the ECU 8 executes the abrupt deceleration determination (the rotation change rate determining method), which has the high determination accuracy although the required time is long, by the rotation change rate of each wheel, whereas when it is determined that the road surface μ is low, the ECU 8 executes the abrupt deceleration determination (the brake determining method), which has the short required time, by the brake operation information. With these operations, the vehicle stabilizing performance can be secured in the vicinity of the tire friction limit while decreasing the fuel economy.

In the embodiment, the speed, the lateral G, and the road surface μ are exemplified as the information as to the driving state of the vehicle that is the determination reference for selecting the abrupt deceleration determining methods.

However, any one or plural ones of them, for example, the vehicle speed and the lateral G, the road surface μ and the lateral G, the vehicle speed and the road surface μ, or the vehicle speed, the lateral G, and the road surface μ may be used in combination. When plural determination references are used to select the abrupt deceleration determining methods, optional determining methods may be applied such a method of selecting a final result of abrupt deceleration determination by individually providing a priority with results of abrupt deceleration determinations based on the respective pieces of the information and a method of determining an abrupt deceleration by a majority rule based on individual results of determination.

Although the embodiment exemplifies, as the plural abrupt deceleration determining methods, the three determining methods, i.e. the abrupt deceleration determining method (the brake determining method) based on the brake operation information, the abrupt deceleration determining method (the rotation change rate determining method) based on the rotation change rate of each wheel, and the abrupt deceleration determining method (the ABS determining method) based on an operation state of the ABS control, some of the determining methods, for example, the brake determining method and the rotation change rate determining method or the brake determining method and the ABS determining method may be used.

Further, other abrupt deceleration determining method may be used in place of the brake determining method when the required time until determination is shorter in comparison with the other determining method. Likewise, the rotation change rate determining method and the ABS determining method may be replaced with other abrupt deceleration determining methods.

Second Embodiment

Figure 7:
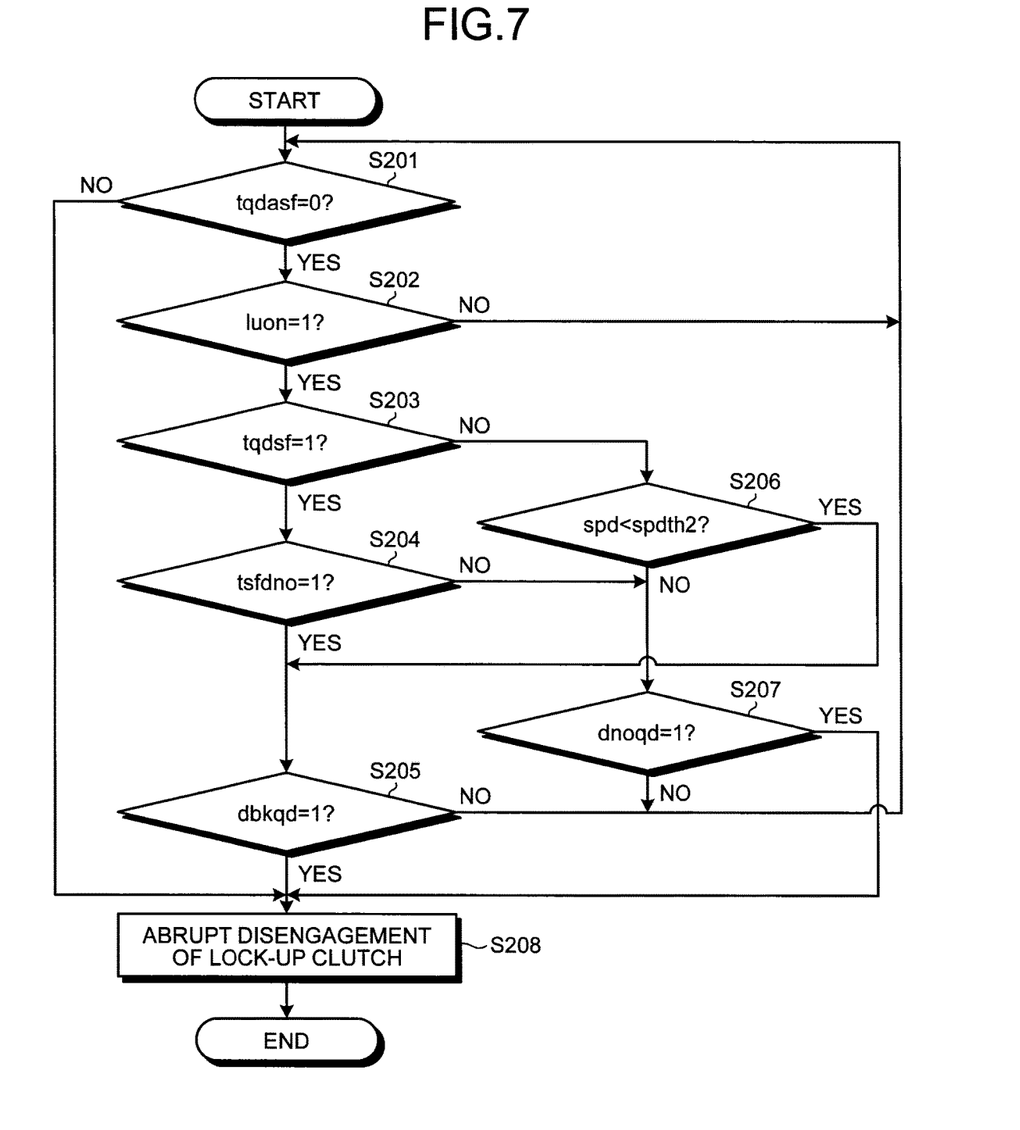
FIG. 7 is a flowchart illustrating an abrupt deceleration determining process and an abrupt deceleration processing control by a vehicle controller according to a second embodiment of the present invention.
Figure 8:
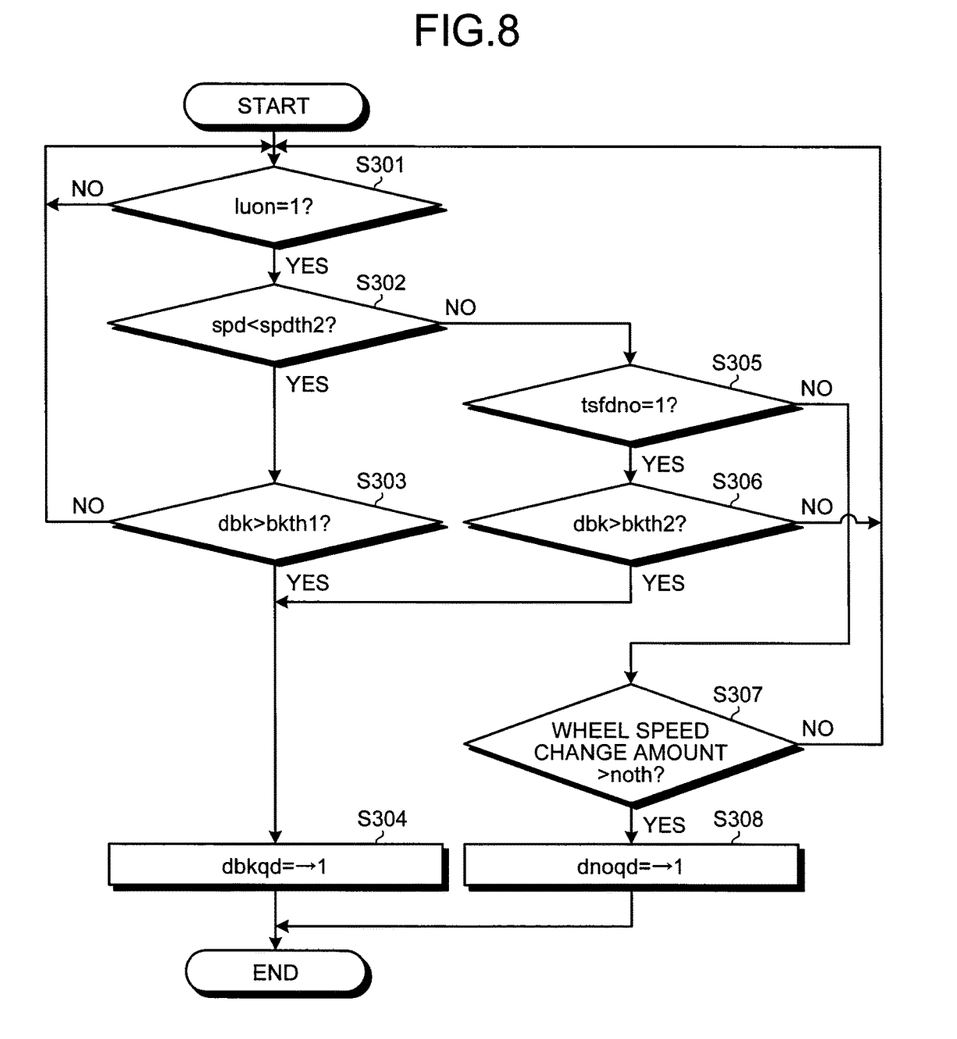
FIG. 8 is a flowchart illustrating an abrupt deceleration determining process of the second embodiment when a failure occurs.

A second embodiment of the present invention will be explained referring to FIGS. 7 to 8. FIG. 7 is a flowchart illustrating an abrupt deceleration determining process and an abrupt deceleration processing control by a vehicle controller according to a second embodiment of the present invention, and FIG. 8 is a flowchart illustrating an abrupt deceleration determining process when a failure occurs.

The second embodiment is different from the first embodiment in that (i) when abnormality (a failure) occurs in any of plural abrupt deceleration determining means, an abrupt deceleration determining means to which the abnormality occurs is set is substituted by other abrupt deceleration determining means in a region where the abnormal abrupt deceleration determining means is set, and (ii) at the time of substitution with other abrupt deceleration determining means, a determination threshold value of an abrupt deceleration used in an intrinsic region is changed.

First, the feature (i) will be explained referring to FIG. 7. A flow illustrated in FIG. 7 exemplifies a process when an ECU 8 can execute two abrupt deceleration determining means, i.e. a brake determining method (a brake determining unit 81) and a rotation change rate determining method (a rotation change rate determining unit 82). The flow illustrated in FIG. 7 is executed by the ECU 8 at, for example, every predetermined cycle.

First, whether or not both the brake determining unit 81 and the rotation change rate determining unit 82 are in a failed state is confirmed (S201). The ECU 8 confirms a flag tqdasf showing that both the determining units are in the failed state. When at least any one of the brake determining unit 81 and the rotation change rate determining unit 82 is not in the failed state (tqdasf=0), the ECU 8 goes to step S202. When both the brake determining unit 81 and the rotation change rate determining unit 82 are in the failed state (tqdasf=1), the ECU 8 interrupts a lock-up control regardless a state of the lock-up control, abruptly disengages a lock-up clutch (S208), and finishes the process.

When it is determined at step S201 that at least one of the brake determining unit 81 and the rotation change rate determining unit 82 is not in the failed state (tqdasf=0), a state of the lock-up control is determined (S202). When lock-up ON (luon=1), the ECU 8 goes to step S203, whereas when lock-up OFF (luon=0), the ECU 8 returns to step S201.

When lock-up ON (luon=1) is determined at step S202, whether or not one of the brake determining unit 81 and the rotation change rate determining unit 82 is the failed state is confirmed (S203). Specifically, the ECU 8 confirms a flag tqdsf showing that one of the determining units is in the failed state. When one of the brake determining unit 81 and the rotation change rate determining unit 82 is in the failed state (tqdsf=1), the ECU 8 goes to step S204. When none of both the brake determining unit 81 and the rotation change rate determining unit 82 is in the failed state (tqdsf=0), the ECU 8 goes to step S206.

When it is determined at step S203 that none of both the brake determining unit 81 and the rotation change rate determining unit 82 is in the failed state (tqdsf=0), the same processes as the first embodiment are executed thereafter. Specifically, an abrupt deceleration determination is executed by any of the brake determining method or the rotation change rate determining method according to a magnitude relation of a vehicle speed spd and a second threshold value spdth2. Processing steps S206, S207, S205, and S208 correspond to steps S104, S105, S106, and S107 of FIG. 5 of the first embodiment.

In contrast, when it is determined at step S203 that one of the brake determining unit 81 and the rotation change rate determining unit 82 is in the failed state (tqdsf=1), next, it is confirmed whether or not the rotation change rate determining unit 82 is in the failed state (S204). Specifically, the ECU 8 confirms a flag tsfdno showing that the rotation change rate determining unit 82 is in the failed state. When the rotation change rate determining unit 82 is in the failed state (tsfdno=1), the ECU 8 goes to step S205 and executes the abrupt deceleration determination based on brake operation information regardless the vehicle speed. In contrast, when the rotation change rate determining unit 82 is not in the failed state (tsfdno=0), i.e. when the brake determining unit 81 is in the failed state, the ECU 8 goes to step S207 and executes the abrupt deceleration determination based on a change amount (a deceleration) of each wheel regardless the vehicle speed.

The flags tqdasf, tqdsf, and tsfdno used in the flowchart can be switched by the ECU 8 based on various types of sensor information of a vehicle 1.

An interrupt process of the economic run control can also be executed by the same configuration as the flowchart of FIG. 7. It is sufficient, for example, to change step S202 to a determining process for determining whether or not the economic run control is being executed and to change step S208 to a clutch engaging operation process resulting from the interruption of the economic run control.

Further, the process can also be executed in the case of that either of the brake determining method (the brake determining unit 81) or the rotation change rate determining method (the rotation change rate determining unit 82) is replaced with an ABS determining method (an ABS determining unit 83) by the same configuration as the flowchart of FIG. 7. Further, even when the three abrupt deceleration determining means including the ABS determining method (the ABS determining unit 83) are disposed, a failed determining means can be substituted by other determining means.

Even when a part of the plural abrupt deceleration determining means has become the failed state, since the feature (i) can cause the abrupt deceleration determination to be executed to an entire driving state of a vehicle, the lock-up control and the economic run control can be continued and a deterioration of the fuel economy can be suppressed also at the time of abnormality of the vehicle.

Next, the feature (ii) will be explained referring to FIG. 8. A flow illustrated in FIG. 8 exemplifies a process when the ECU 8 can execute the two abrupt deceleration determining means, i.e. the brake determining method (the brake determining unit 81) and the rotation change rate determining method (the rotation change rate determining unit 82) and the brake determining unit 81 is substituted when the rotation change rate determining unit 82 fails. A flow illustrated in FIG. 8 is executed by the ECU 8 at, for example, every predetermined cycle.

First, a state of the lock-up control is determined (S301). When lock-up ON (luon=1), the ECU 8 goes to step S302, whereas when lock-up OFF (luon=0), the ECU 8 holds until luon=1.

When lock-up ON (luon=1) is determined at step S301, it is confirmed whether or not the vehicle speed spd is smaller than the second threshold value spdth2 (S302). When the vehicle speed spd is smaller than the second threshold value spdth2, the ECU 8 goes to step S303, whereas when the vehicle speed spd is equal to or larger than the second threshold value spdth2, the ECU 8 goes to step S305.

When the vehicle speed spd is smaller than the second threshold value spdth2 at step S302, the abrupt deceleration determination is executed based on brake operation information dbk (S303). Specifically, the brake determining unit 81 confirms whether or not the brake operation information dbk is larger than a first brake determination threshold value bkth1. The first brake determination threshold value bkth1 is a threshold value used in an application region of the brake determining method (spd<spdth2). When dbk>bkth1, the brake determining unit 81 detects a generation of the abrupt deceleration, the ECU 8 goes to step S304, sets up a flag dbkqd (dbkqd=1), and finishes the process. In contrast, when dbk≤bkth1, the brake determining unit 81 does not detect the abrupt deceleration, the ECU 8 returns to step S301 and continues the process.

When the vehicle speed spd is equal to or larger than the second threshold value spdth2 at step S302, it is confirmed that whether or not the rotation change rate determining unit 82 is in the failed state (S305). When the rotation change rate determining unit 82 is in the failed state (tsfdno=1), the abrupt deceleration determination is executed based on the brake operation information dbk (S306). Specifically, the brake determining unit 81 confirms whether or not the brake operation information dbk is larger than a second brake determination threshold value bkth2. The second brake determination threshold value bkth2 is a threshold value used in an application region (spdth2≤spd) of the rotation change rate determining method and is set larger than the first brake determination threshold value bkth1 (bkth1<bkth2) to improve an accuracy of an abrupt brake determination even in the brake determining method (to make an erroneous determination to be unlikely to occur).

When dbk>bkth2, the brake determining unit 81 detects the generation of the abrupt deceleration, the ECU 8 goes to step S304, sets up the flag dbkqd (dbkqd=1), and finishes the process. In contrast, when dbk≤bkth2, since the brake determining unit 81 does not detect the abrupt deceleration, the ECU 8 returns to step S301 and continues the process.

When the rotation change rate determining unit 82 is not in the failed state at step S305 (tsfdno=0), the rotation change rate determining unit 82 ordinarily executes the abrupt deceleration determination (S307). Specifically, the rotation change rate determining unit 82 confirms whether or not a change amount of each wheel is larger than a predetermined threshold value noth. When a wheel speed change amount>noth, the rotation change rate determining unit 82 detects the generation of the abrupt deceleration, the ECU 8 goes to step S308, the flag dnoqd is set up (dnoqd=1), and finishes the process. In contrast, when the wheel speed change amount≤noth, since the rotation change rate determining unit 82 does not detect the abrupt deceleration, the ECU 8 returns to step S301 and continues the process.

In the flowchart of FIG. 8, when the information as to the brake determining unit 81 is replaced with the information as to the rotation change rate determining unit 82, the brake determining unit 81 can be substituted by the rotation change rate determining unit 82 when it fails. In the case, a threshold value used by the rotation change rate determining unit 82 in the application region (spd<spdth2) of the brake determining unit 81 is smaller than the threshold value noth used ordinarily (to execute the abrupt brake determination at an early stage even in the rotation change rate determining method and to decrease a determination time).

Further, the flowchart of FIG. 8 can be configured as a process when one of the brake determining method (the brake determining unit 81) or the rotation change rate determining method (the rotation change rate determining unit 82) is replaced with the ABS determining method (the ABS determining unit 83). Further, the flowchart can be applied also to a case disposed with the three abrupt deceleration determining means including the ABS determining method as well (the ABS determining unit 83).

Since the above described feature (ii) can change the threshold value for the abrupt deceleration determination executed by a determining method that is substituted when a failure occurs from an ordinary threshold value to a threshold value of a more suitable level, the abrupt deceleration determination can be preferably executed even at the time of the failure, thereby the deterioration of the fuel economy can be suppressed.

In the embodiment, when the rotation change rate determining unit 82 has become the failed state, although improvement of a determination accuracy is attempted by substituting to make the determination threshold value of the brake determining unit 81 increased (bkth1→bkth2), likewise, making a time until the abrupt braking state is determined and a time until an execution of the control (the lock-up control and the economic run control) is instructed based on the abrupt brake determination delayed may also be possible.

Further, in the embodiment, when the brake determining method fails, the method is substituted by other determining method though, the brake determining method may also be executed using other information as to a brake operation, for example, whether or not a stop lamp switch is turned on or off alternatively.

Although the preferable embodiments have been shown and explained as to the present invention, the present invention is by no means restricted by the embodiments. The present invention may be configured by combining plural sets of the embodiments explained above or can change the respective components of the embodiments to components that can be replaced by a person skilled in the art and are easy or to substantially the same components. For example, the respective function blocks of the ECU 8 illustrated in FIG. 1 are exemplified for the convenience of explanation to the utmost and other configurations may be employed as long as they can realize the same functions.

REFERENCE SIGNS LIST

1 vehicle
2 engine
4 driving wheel
5c lock-up clutch
6 clutch
10 vehicle controller
81 brake determining unit (second abrupt deceleration determining means)
82 rotation change rate determining unit (rotation change rate determining means, first abrupt deceleration determining means)
83 ABS determining unit (ABS determining means, first abrupt deceleration determining means)

The invention claimed is:

1. A vehicle comprising:
   circuitry configured to:
      determine a generation of an abrupt deceleration state of a vehicle in a first manner;
      determine the generation of the abrupt deceleration state of the vehicle in a second manner having a required time for the determination shorter in comparison with that of the first manner;
      select any one of the first manner and the second manner according to a vehicle speed of the vehicle or a road surface friction coefficient and use the selected manner for determining the abrupt deceleration of the vehicle; and
   a clutch disposed between an engine and driving wheels, wherein
   the second manner is selected in a region where the vehicle speed or the road surface friction coefficient is lower and used for determining the abrupt deceleration,
   the first manner is selected in a region where the vehicle speed or the road surface friction coefficient is higher and used for determining the abrupt deceleration, and when the clutch is engaged at the time that the abrupt deceleration of the vehicle is determined by the first manner or the second manner, the clutch is abruptly disengaged.

2. The vehicle according to claim 1, wherein
   in the second manner, the circuitry is configured to determine the abrupt deceleration operation based on brake operation information of the vehicle.

3. The vehicle according to claim 1, wherein
   in the first manner, the circuitry is configured to determine the abrupt deceleration based on a rotation change rate of each wheel or based on an operation state of an ABS.

4. The vehicle according to claim 1, wherein the circuitry is configured to:
   use the second manner in a region where a lateral acceleration of the vehicle is larger, and
   use the first manner in a region where the lateral acceleration of the vehicle is smaller.

5. The vehicle according to claim 1, wherein
   at a time that an abnormality occurs using the first manner, the circuitry is configured to use the second manner even in a region where the first manner is used, and
   the circuitry is configured to increase a determination threshold value of an abrupt deceleration determination in the region to increase a determination accuracy of the second manner.

6. The vehicle according to claim 1, wherein
   at a time that an abnormality occurs using the second manner, the circuitry is configured to use the first manner even in a region where the second manner is used, and
   the circuitry is configured to decrease a determination threshold value of an abrupt deceleration determination in the region to decrease a determining time of the first manner.

7. The vehicle according to claim 1, wherein
   the clutch is a lock-up clutch disposed in a power transmission path between the engine and the driving wheels, and
   when the lock-up clutch is engaged at the time that the abrupt deceleration of the vehicle is determined by the first manner or the second manner, the lock-up clutch is abruptly disengaged.

8. The vehicle according to claim 1, wherein
   the clutch is configured to connect and disconnect a power transmission path between the engine and the driving wheels,
   an economic run control for executing inertia traveling by disengaging the clutch can be executed at a time the vehicle decelerates, and
   when the economic run control is executed at the time the abrupt deceleration is determined by the first manner or the second manner, the economic run control is interrupted and the clutch is engaged.

9. The vehicle according to claim 2, wherein
   in the first manner, the circuitry is configured to determine the abrupt deceleration based on a rotation change rate of each wheel or based on an operation state of an ABS.

10. The vehicle according to claim 2, wherein the circuitry is configured to:
    use the second manner in a region where a lateral acceleration of the vehicle is larger, and
    use the first manner in a region where the lateral acceleration of the vehicle is smaller.

11. The vehicle according to claim 3, wherein the circuitry is configured to:

use the second manner in a region where a lateral acceleration of the vehicle is larger, and
use the first manner in a region where the lateral acceleration of the vehicle is smaller.

12. The vehicle according to claim 2, wherein
at a time that an abnormality occurs using the first manner, the circuitry is configured to use the second manner even in a region where the first manner is used, and
the circuitry is configured to increase a determination threshold value of an abrupt deceleration determination in the region to increase a determination accuracy of the second manner.

13. The vehicle according to claim 3, wherein
at a time that an abnormality occurs using the first manner, the circuitry is configured to use the second manner even in a region where the first manner is used, and
the circuitry is configured to increase a determination threshold value of an abrupt deceleration determination in the region to increase a determination accuracy of the second manner.

14. The vehicle according to claim 4, wherein
at a time that an abnormality occurs using the first manner, the circuitry is configured to use the second manner even in a region where the first manner is used, and
the circuitry is configured to increase a determination threshold value of an abrupt deceleration determination in the region to increase a determination accuracy of the second manner.

15. The vehicle according to claim 2, wherein
at a time that an abnormality occurs using the second manner, the circuitry is configured to use the first manner even in a region where the second manner is used, and
the circuitry is configured to decrease a determination threshold value of an abrupt deceleration determination in the region to decrease a determining time of the first manner.

16. The vehicle according to claim 3, wherein
at a time that an abnormality occurs using the second manner, the circuitry is configured to use the first manner even in a region where the second manner is used, and
the circuitry is configured to decrease a determination threshold value of an abrupt deceleration determination in the region to decrease a determining time of the first manner.

17. The vehicle according to claim 4, wherein
at a time that an abnormality occurs using the second manner, the circuitry is configured to use the first manner even in a region where the second manner is used, and
the circuitry is configured to decrease a determination threshold value of an abrupt deceleration determination in the region to decrease a determining time of the first manner.

18. The vehicle according to claim 5, wherein
at a time that an abnormality occurs using the second manner, the circuitry is configured to use the first manner even in a region where the second manner is used, and
the circuitry is configured to decrease a determination threshold value of an abrupt deceleration determination in the region to decrease a determining time of the first manner.

* * * * *